US012570552B2

(12) United States Patent
Kim et al.

(10) Patent No.: US 12,570,552 B2
(45) Date of Patent: Mar. 10, 2026

(54) WATER SOFTENING SYSTEM

(71) Applicant: Kyungdong Navien Co., LTD, Gyeonggi-do (KR)

(72) Inventors: Bum Seup Kim, Seoul (KR); Soo Young Lee, Seoul (KR)

(73) Assignee: KYUNGDONG NAVIEN CO., LTD., Gyeonggi-do (KR)

( * ) Notice: Subject to any disclaimer, the term of this patent is extended or adjusted under 35 U.S.C. 154(b) by 1201 days.

(21) Appl. No.: 17/136,753

(22) Filed: Dec. 29, 2020

(65) Prior Publication Data

US 2021/0198127 A1 Jul. 1, 2021

(30) Foreign Application Priority Data

Dec. 31, 2019 (KR) ........................ 10-2019-0179886

(51) Int. Cl.
 *C02F 1/469* (2023.01)
 *C02F 1/00* (2023.01)
(52) U.S. Cl.
 CPC ............ *C02F 1/4695* (2013.01); *C02F 1/008* (2013.01); *C02F 1/4691* (2013.01); *C02F 2201/005* (2013.01); *C02F 2301/043* (2013.01); *C02F 2303/16* (2013.01)
(58) Field of Classification Search
 CPC ........ C02F 1/469–4698; B01D 35/147; B01D 2311/253
 See application file for complete search history.

(56) References Cited

U.S. PATENT DOCUMENTS 7,338,595 B2 * 3/2008 VanNewenhizen ....... C02F 9/20
 210/197
2004/0060602 A1 * 4/2004 Mullins ............... A61M 1/1674
 137/551

(Continued)

FOREIGN PATENT DOCUMENTS

JP H10-66971 A 3/1998
JP 2010-051905 A 3/2010

(Continued)

OTHER PUBLICATIONS

Office Action for related Korean Patent Application No. 10-2019-017986 dated Feb. 28, 2022, 11 pages long.

(Continued)

*Primary Examiner* — Luan V Van
*Assistant Examiner* — Andrew Koltonow
(74) *Attorney, Agent, or Firm* — MCDONALD HOPKINS LLC

(57) ABSTRACT

A water softening system includes a main line that supplies raw water to a first consumption point in a consumption site, a filter device that is provided in the main line and that removes at least a part of ionic substances contained in the raw water supplied through the main line and releases soft water containing a smaller amount of ionic substances than the raw water to the main line, a first bypass line that connects a first bypass point and a confluence point and diverts the raw water in the main line from the first bypass point to the confluence point, and a second bypass line that is connected to a second bypass point and that diverts the soft water to a second consumption point in the consumption site.

9 Claims, 9 Drawing Sheets

(56)             References Cited

U.S. PATENT DOCUMENTS

2013/0277222 A1* 10/2013 Kwon .................. C02F 1/4691
                                                    204/663
2016/0002076 A1*   1/2016 Jha ........................ C02F 1/4691
                                                    204/520
2016/0368790 A1* 12/2016 Son ...................... C02F 1/4691

FOREIGN PATENT DOCUMENTS

JP          2014-008463  A      1/2014
KR     10-2019-0134290  A     12/2019

OTHER PUBLICATIONS

Notice of Allowance for corresponding Korean Patent Application
No. 10-2019-0179886, dated Sep. 28, 2022, 6 pages long.

* cited by examiner

WATER SOFTENING SYSTEM

CROSS-REFERENCE TO RELATED APPLICATION

This application claims the benefit of priority to Korean Patent Application No. 10-2019-0179886, filed in the Korean Intellectual Property Office on Dec. 31, 2019, the entire contents of which are incorporated herein by reference.

TECHNICAL FIELD

The present disclosure relates to a water softening system.

BACKGROUND

A method of treating raw water may be broadly classified into a point of entry (POE) method and a point of use (POU) method. The POE method is a method of treating all of raw water that is supplied to a consumption site. To this end, in the POE method, a device for treating the raw water is located at the point where the raw water enters the consumption site. The POU method is a method of treating only raw water that is dispensed to a user. To this end, in the POU method, a device for treating the raw water is located directly ahead of the point where the raw water is dispensed in response to a request of the user. In general, a water treatment method using an ion exchange resin, which is widely applied to the POE method, cannot treat raw water to an extend that the raw water is able to be drunk. Therefore, even though a POE type device is installed, it is common to additionally install a POU type device for drinking water.

SUMMARY

The present disclosure has been made to solve the above-mentioned problems occurring in the prior art while advantages achieved by the prior art are maintained intact.

An aspect of the present disclosure provides a water softening system for treating all of raw water that is supplied to a consumption site and supplying, to the consumption site, raw water treated to an extent that the raw water is able to be drunk.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a water softening system includes a main line that supplies raw water to a first consumption point in a consumption site, a filter device that is provided in the main line and that removes at least a part of ionic substances contained in the raw water supplied through the main line and releases soft water containing a smaller amount of ionic substances than the raw water to the main line, a first bypass line that connects a first bypass point and a confluence point and diverts the raw water in the main line from the first bypass point to the confluence point, the first bypass point being one point of the main line that is located upstream of the filter device and the confluence point being another point of the main line that is located downstream of the filter device, and a second bypass line that is connected to a second bypass point and that diverts the soft water, which is released from the filter device to the main line, to a second consumption point in the consumption site, the second bypass point being another point of the main line that is located between the filter device and the confluence point.

According to an embodiment, the water softening system may further include a controller that controls the filter device. The filter device may include a filter unit that removes at least a part of the ionic substances contained in the raw water, based on an electric force. To supply the soft water as drinking water to the second consumption point, the controller may control the filter device such that a higher voltage is applied to the filter unit when the soft water is supplied to the second consumption point through the second bypass line than when the soft water is supplied to the first consumption point through the main line.

According to an embodiment, the water softening system may further include a valve device including a first valve provided in the first bypass line between the first bypass point and the confluence point and a second valve provided in the main line between the second bypass point and the confluence point, and a controller that controls the valve device.

According to an embodiment, the controller may perform control such that the first valve is closed and the second valve is opened, when supply of the soft water to the first consumption point is requested and supply of the soft water to the second consumption point is not requested.

According to an embodiment, the controller may perform control such that the first valve is opened and the second valve is closed, when supply of the soft water to the second consumption point is requested.

According to an embodiment, the main line may include a first branch line and a second branch line that branch off from each other between the first and second bypass points and thereafter join together between the first and second bypass points. The filter device may include a first filter unit that is provided in the first branch line and that selectively performs one of a removal mode for removing the ionic substances by electro-deionization through electrodes and a regeneration mode for regenerating the electrodes and a second filter unit that is provided in the second branch line and that selectively performs one of a removal mode for removing the ionic substances by electro-deionization through electrodes and a regeneration mode for regenerating the electrodes.

According to an embodiment, the water softening system may further include a valve device including a first valve provided in the first bypass line between the first bypass point and the confluence point, a second valve provided in the main line between the second bypass point and the confluence point, a third valve provided downstream of the first filter unit in the first branch line, and a fourth valve provided downstream of the second filter unit in the second branch line, and a controller that controls the valve device and the filter device.

According to an embodiment, when supply of the soft water to the second consumption point is requested, the controller may perform control such that the first valve is opened, the second valve is closed, the third valve is opened, the fourth valve is closed, the first filter unit performs the removal mode, and the second filter unit performs the regeneration mode.

According to an embodiment, when supply of the soft water to the second consumption point continues to be requested until predetermined first reference time elapses from the time the soft water starts to be supplied to the second consumption point, the controller may perform control after the first reference time such that the first valve maintains an open state, the second valve maintains a closed state, the third valve is closed, the fourth valve is opened, the first filter unit performs the regeneration mode, and the second filter unit performs the removal mode.

According to an embodiment, when supply of the soft water to the second consumption point is requested and thereafter supply of the soft water to the first and second consumption points is not requested, the controller may perform control such that the first valve is closed or maintains a closed state, the second valve is opened or maintains an open state, one of the third and fourth valves that remains open is closed, the other valve that remains closed is opened, one of the first and second filter units that performs the regeneration mode stops operation, and the other filter unit that performs the removal mode performs the regeneration mode.

According to an embodiment, when supply of the soft water to the second consumption point is requested and thereafter supply of the soft water to the second consumption point is not requested in a state in which supply of the soft water to the first consumption point is requested, the controller may perform control such that the first valve is closed or maintains a closed state, the second valve is opened or maintains an open state, one of the third and fourth valves that remains open is closed, the other valve that remains closed is opened, one of the first and second filter units that performs the regeneration mode performs the removal mode, and the other filter unit that performs the removal mode performs the regeneration mode.

According to an embodiment, in a predetermined standby state, the controller may perform control such that the first valve is closed or maintains a closed state, the second valve is opened or maintains an open state, the third valve is opened or maintains an open state, the fourth valve is closed or maintains a closed state, and the first and second filter units stop operation or maintain a stop state.

According to an embodiment, when supply of the soft water to the first or second consumption point is requested and thereafter supply of the soft water to the first and second consumption points is not requested, the controller may perform control such that the first to fourth valves and the first and second filter units are in the standby state.

According to another aspect of the present disclosure, a water softening system includes a filter device that is provided in a main line for supplying raw water to a first consumption point in a consumption site and that removes at least a part of ionic substances contained in the raw water supplied through the main line and releases soft water containing a smaller amount of ionic substances than the raw water to the main line, and a bypass line that is connected to a bypass point and that diverts the soft water, which is released from the filter device to the main line, to a second consumption point in the consumption site, the bypass point being a point of the main line that is located downstream of the filter device.

According to an embodiment, the water softening system may further include a controller that controls the filter device. The filter device may include a filter unit that removes at least a part of the ionic substances contained in the raw water, based on an electric force. The controller may control the filter device such that a higher voltage is applied to the filter unit when the soft water is supplied to the second consumption point through the bypass line than when the soft water is supplied to the first consumption point through the main line.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
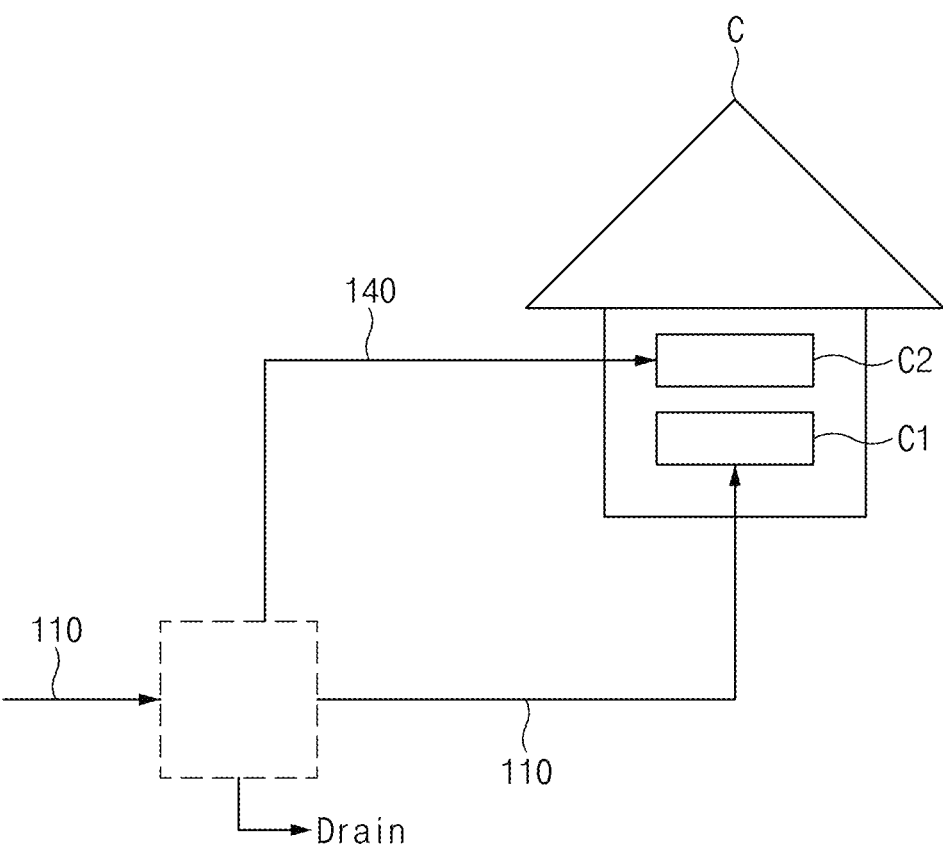
FIG. 1 is a schematic view illustrating a water softening system according to an embodiment of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

Figure 2:
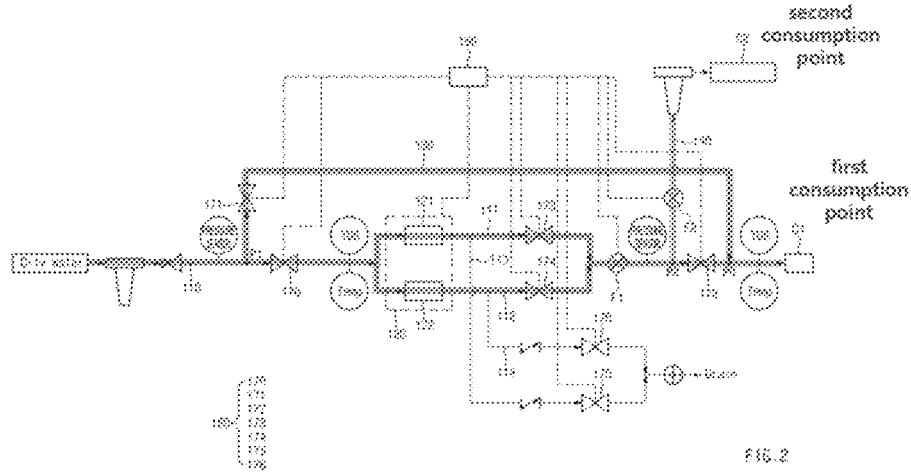
FIG. 2 is a detailed view illustrating the water softening system of FIG. 1.

FIG. 1 is a schematic view illustrating a water softening system according to an embodiment of the present disclosure. FIG. 2 is a detailed view illustrating the water softening system of FIG. 1. As illustrated in FIGS. 1 and 2, the water softening system according to the embodiment of the present disclosure is a system in which a point of entry (POE) type and a point of use (POU) type are integrated with each other. The water softening system includes a main line 110, a filter device 120, a first bypass line 130, and a second bypass line 140.

The main line 110 of this embodiment may be a pipe for supplying raw water to a first consumption point C1 in a consumption site C (refer to FIG. 1). The consumption site C may be a home. The first consumption point C1 may be a faucet or a showerhead. The main line 110 may be split into several lines in the consumption site C to supply water to the faucet or the showerhead.

The filter device 120 of this embodiment is a component for treating the raw water in the main line 110. The filter device 120 is provided in the main line 110. The filter device 120 removes at least a part of ionic substances contained in the raw water supplied through the main line 110 and releases soft water containing a smaller amount of ionic substances than the raw water to the main line 110.

The filter device 120 of this embodiment may include filter units 121 and 122 that remove at least a part of ionic substances contained in the raw water, based on an electric force. When a DC voltage is applied to charged particles in an electrolyte, positively charged particles move to a negative electrode, and negatively charged particles move to a positive electrode. This is called electrophoresis. The filter units 121 and 122 may be electro-deionization type filters that selectively remove ions (ionic substances) in the raw water, based on the principle of an electric force (electrophoresis).

Electro-deionization may be classified into electrodialysis (ED), electrodeionization (EDI), capacitive deionization (CDI), and the like. A filter unit of an ED type usually includes electrodes and an ion exchange membrane. A filter unit of an EDI type usually includes electrodes, an ion exchange membrane, and an ion exchange resin. A filter unit of a CDI type usually includes only electrodes. Alternatively, the filter unit of the CDI type may further include an ion exchange membrane.

Figure 3:
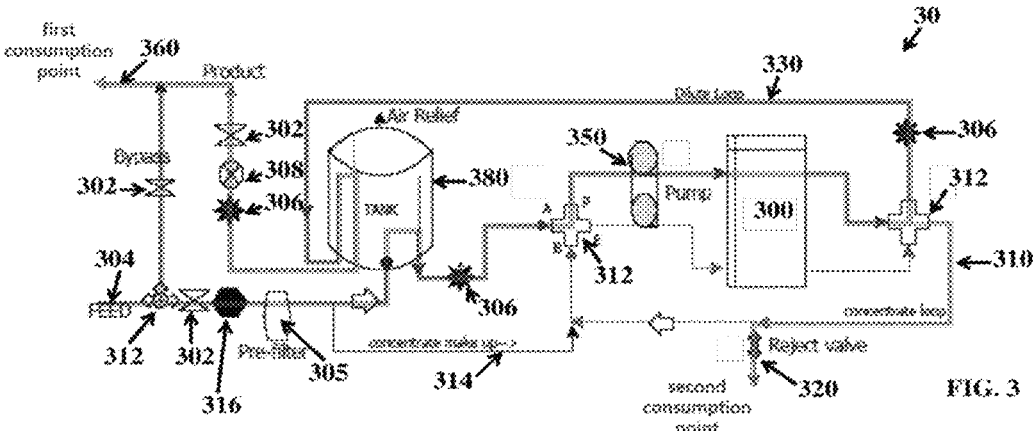
FIG. 3 is a conceptual diagram illustrating a principle by which ions are removed in a CDI type.
Figure 4:
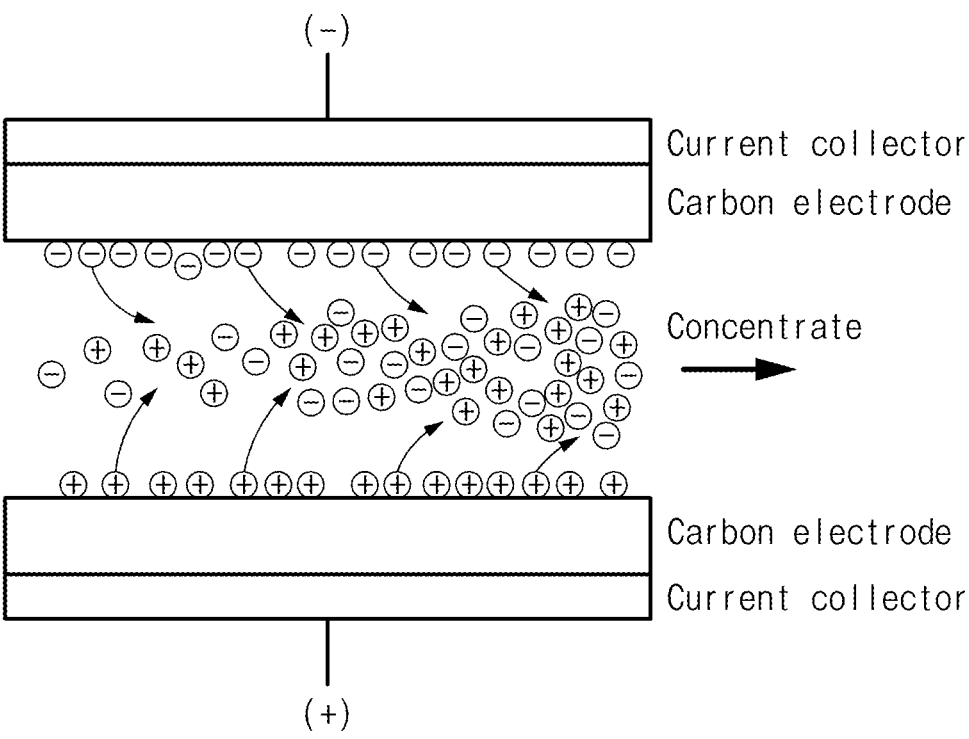
FIG. 4 is a conceptual diagram illustrating a principle by which electrodes are regenerated in the CDI type.

The filter units 121 and 122 of this embodiment may be filter units of a CDI type. The CDI refers to a method of removing ions using a principle by which ions (or ionic substances) are adsorbed on or desorbed from surfaces of electrodes by an electric force. The CDI will be described in detail with reference to FIGS. 3 and 4. FIG. 3 is a conceptual diagram illustrating a principle by which ions are removed in a CDI type. FIG. 4 is a conceptual diagram illustrating a principle by which electrodes are regenerated in the CDI type.

When raw water passes between positive and negative electrodes to which a voltage is applied, as illustrated in FIG. 3, negative ions in the raw water move to the positive electrode, and positive ions in the raw water move to the negative electrode. That is, adsorption occurs. The ions may be removed from the raw water by the adsorption. Hereinafter, a mode for removing ions (ionic substances) in such a way is referred to as a removal mode. After the adsorption, as illustrated in FIG. 4, the electrodes need to be regenerated by desorbing the ions adsorbed on the electrodes. To this end, the voltage applied to the electrodes may be inverted. Hereinafter, a mode for regenerating electrodes in such a way is referred to as a regeneration mode.

As illustrated in FIG. 2, the first bypass line 130 of this embodiment may be a pipe that connects a first bypass point P1 of the main line 110 and a confluence point P0 of the main line 110 and diverts the raw water in the main line 110 from the first bypass point P1 to the confluence point P0. The first bypass point P1 is one point of the main line 110 that is located upstream of the filter device 120. The confluence point P0 is another point of the main line 110 that is located downstream of the filter device 120.

The second bypass line 140 of this embodiment may be a pipe that is connected to a second bypass point P2 of the main line 110 and that diverts the soft water, which is released from the filter device 120 to the main line 110, to a second consumption point C2 in the consumption site C. The second bypass point P2 is one point of the main line 110 that is located between the filter device 120 and the confluence point P0. The second consumption point C2 may be a faucet for supplying drinking water to a user. The second bypass line 140 may be additionally installed in the existing consumption site C. A sediment filter for removal of foreign matter may be provided in the second bypass line 140.

The water softening system of this embodiment may supply the soft water to the first consumption point C1 in the consumption site C. For example, the water softening system of this embodiment may generate the soft water through the filter device 120 and may supply the soft water to the first consumption point C1 through the main line 110. As described above, the water softening system of this embodiment may be used as a POE water softening system.

The water softening system of this embodiment may supply differently-treated soft water to the first consumption point C1 and the second consumption point C2 in the consumption site C. For example, the water softening system of this embodiment may supply, to the second consumption point C2, soft water from which more ionic substances are removed, by applying a higher voltage to the filter units 121 and 122 when soft water is supplied to the second consumption point C2 through the second bypass line 140 than when soft water is supplied to the first consumption point C1 through the main line 110.

The filter device 120 of this embodiment may include the filter units 121 and 122 of an electro-deionization type as described above. The electro-deionization type filter units 121 and 122 may treat the raw water to a level of drinking water. When soft water is supplied to the second consumption point C2 through the second bypass line 140, the filter units 121 and 122 may treat the raw water to the level of drinking water, and the water softening system of this embodiment may supply drinking water to the second consumption point C2. As described above, the water softening system of this embodiment may be used as a POU water softening system.

The water softening system of this embodiment may supply the raw water to the first consumption point C1 through the first bypass line 130 while supplying soft water to the second consumption point C2. Accordingly, the water softening system of this embodiment is able to supply the raw water to the first consumption point C1 through the first bypass line 130 while supplying drinking water to the second consumption point C2 through the second bypass line 140.

The water softening system of this embodiment may further include a controller 150 to control the filter device 120 as described above. To supply soft water as drinking water to the second consumption point C2, the controller 150 may control the filter device 120 such that a higher voltage is applied to the filter units 121 and 122 of the filter device 120 when soft water is supplied to the second consumption point C2 through the second bypass line 140 than when soft water is supplied to the first consumption point C1 through the main line 110. The filter device 120 may include a power supply (not illustrated), or may be connected to a separate power supply.

The controller 150 of this embodiment may include a processor and a memory. The processor may include a microprocessor such as a field programmable gate array (FPGA), an application specific integrated circuit (ASIC), a central processing unit (CPU), or the like. The memory may store control instructions, on the basis of which the processor generates instructions for control. The memory may be a data store such as a hard disk drive (HDD), a solid state drive (SSD), a volatile medium, a non-volatile medium, or the like.

The main line 110 of this embodiment, as illustrated in FIG. 2 may include a first branch line 111 and a second branch line 112 that branch off from each other between the first and second bypass points P1 and P2 and thereafter join together between the first and second bypass points P1 and P2. The main line 110 of this embodiment may further include a first drain line 113 and a second drain line 114 to drain reclaimed water generated in a regeneration mode.

The filter device 120 of this embodiment may include the first filter unit 121 provided in the first branch line 111 and the second filter unit 122 provided in the second branch line 112. The first and second filter units 121 and 122 may be configured to selectively perform one of the removal mode and the regeneration mode described above. The first and second filter units 121 and 122 may be filters of a capacitive deionization (CDI) type.

The water softening system of this embodiment may further include a valve device 160 including a first valve 171 and a second valve 172. The valve device 160 may further first consumption point C1 and the second consumption point C2 is not requested. The standby state may be an initial state and may be a state in which supply of soft water to the first consumption point C1 or the second consumption point C2 is requested and thereafter the request is stopped. For reference, the main valve 170 may not be provided. This is the same in the following descriptions. For example, a pipe that always allows a fluid flow may be provided at the position of the main valve 170 of FIG. 2.

TABLE 1

| Main Valve 170 | First Valve 171 | Second Valve 172 | Third Valve 173 | Fourth Valve 174 | Fifth Valve 175 | Sixth Valve 176 | First Filter Unit 121 | Second Filter Unit 122 |
|---|---|---|---|---|---|---|---|---|
| Open | Closed | Open | Open | Closed | Closed | Closed | Standby | Standby | include a main valve 170. The main valve 170 is provided in the main line 110 between the first bypass point P1 and the filter device 120. The first valve 171 is provided in the first bypass line 130 between the first bypass point P1 and the confluence point P0. The second valve 172 is provided in the main line 110 between the second bypass point P2 and the confluence point P0.

The valve device 160 may further include a third valve 173 and a fourth valve 174. The third valve 173 is provided downstream of the first filter unit 121 in the first branch line 111. The fourth valve 174 is provided downstream of the second filter unit 122 in the second branch line 112.

The valve device 160 may further include a fifth valve 175 and a sixth valve 176. The fifth valve 175 is provided in the first drain line 113. The sixth valve 176 is provided in the second drain line 114.

The valves 170 to 176 may be solenoid valves. Among the valves 170 to 176, the main valve 170, the second valve 172, and the third valve 173 may be normally-open solenoid valves that are open in a state in which power is not supplied thereto, and the remaining valves 171, 174, 175, and 176 may be normally-closed solenoid valves that are closed in a state in which power is not supplied thereto. However, the types of the valves 170 to 176 are not limited thereto. The main valve 170 and the first valve 171 may be implemented with a single three-way valve.

When a first flow sensor F1 recognizes a flow, the controller 150 may determine that supply of soft water to the first consumption point C1 is requested. When a faucet provided at the first consumption point C1 is opened, the first flow sensor F1 recognizes a flow. Similarly, when a second flow sensor F2 recognizes a flow, the controller 150 may determine that supply of soft water to the second consumption point C2 is requested. When the second flow sensor F2 recognizes a flow, the first flow sensor F1 may also recognize a flow.

Figure 5:
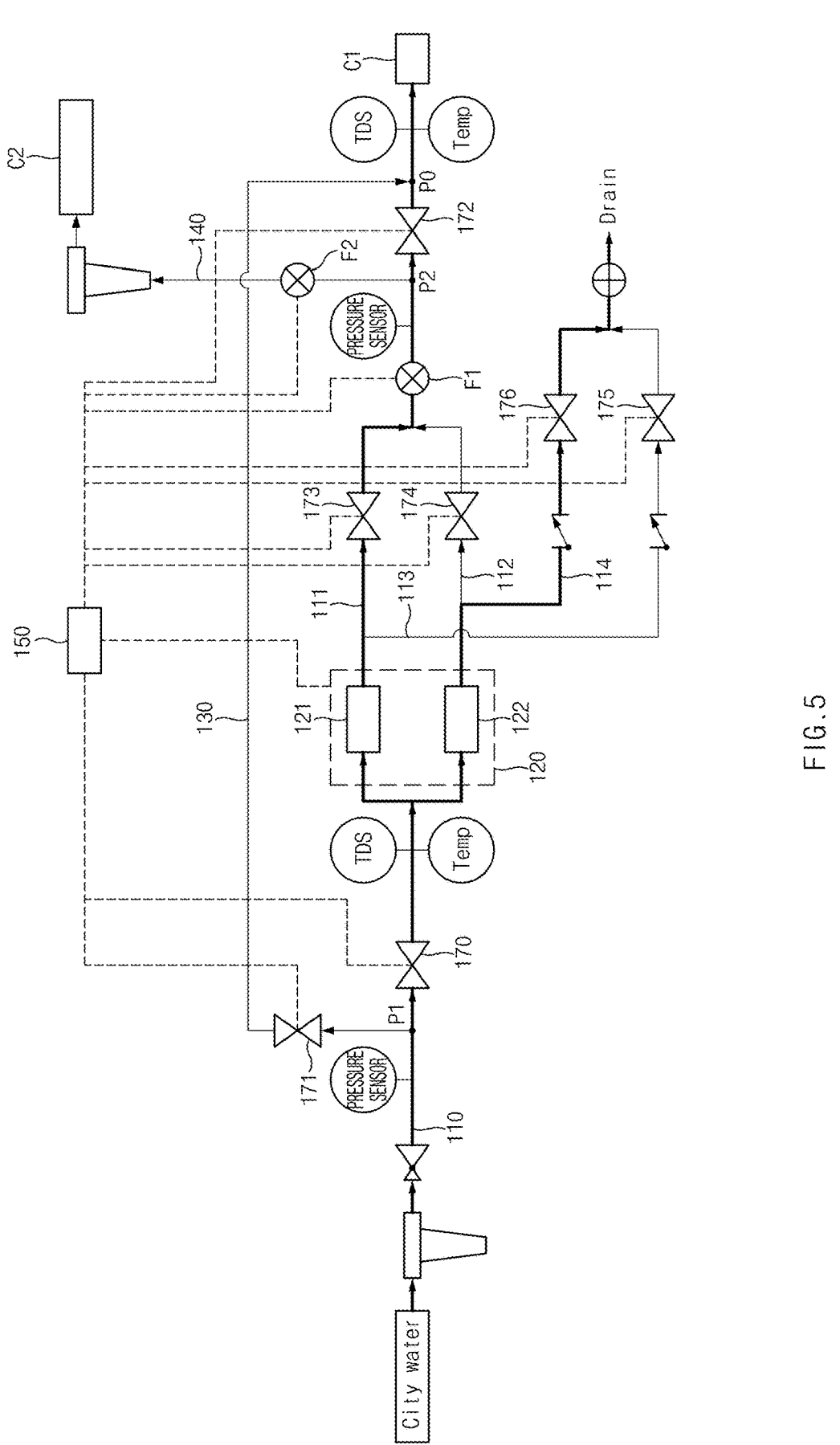
FIGS. 5 and 6 are views illustrating a case where the water softening system of FIG. 2 supplies soft water to a first consumption point.
Figure 6:
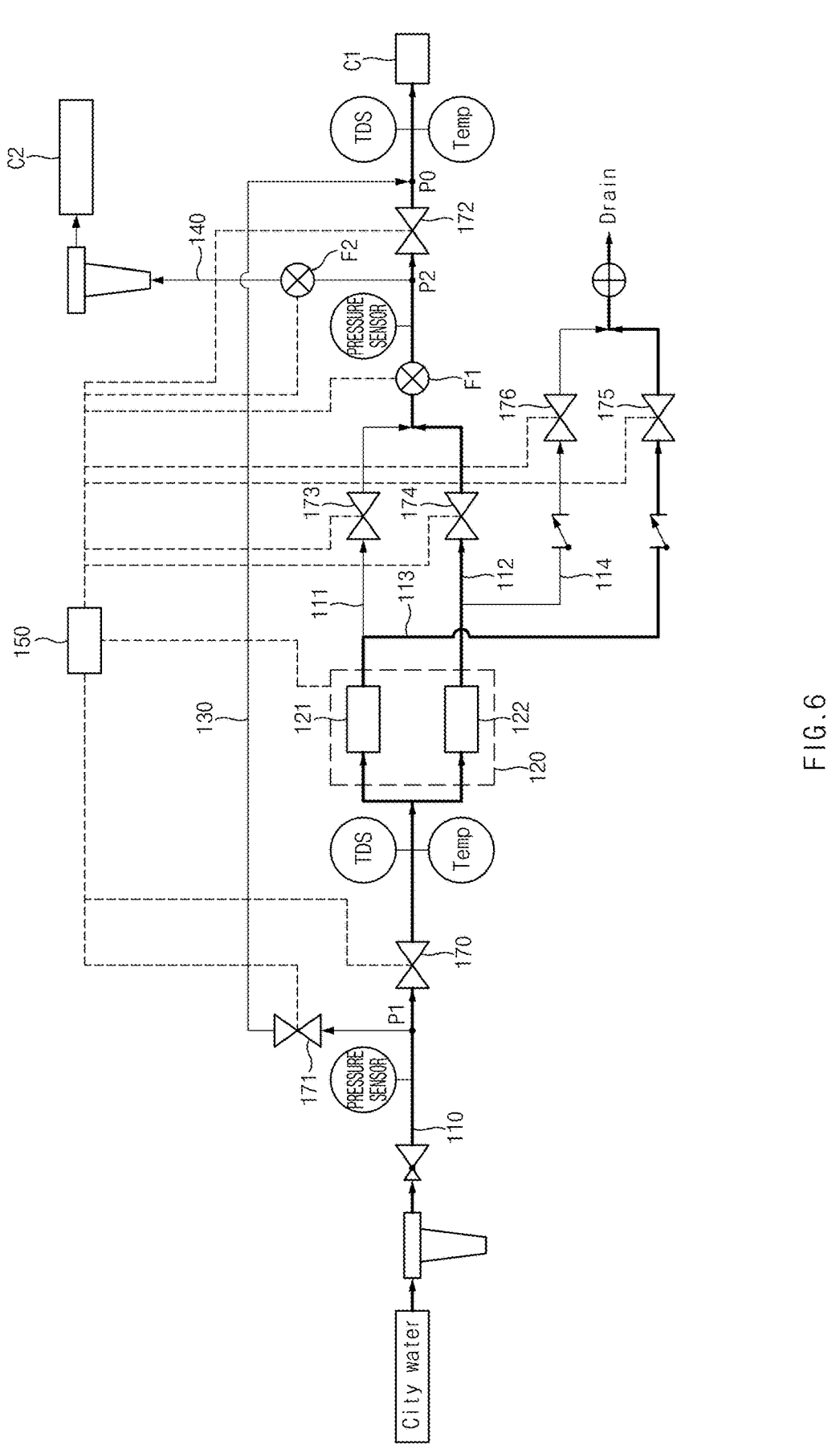

Second, a case where the water softening system of this embodiment supplies soft water to the first consumption point C1 will be described below with reference to FIGS. 5 to 7. The following controls are illustrated in a flowchart of FIG. 7.

The controller 150 may control the filter device 120 and the valve device 160 as in Table 2 below when supply of soft water to the first consumption point C1 is requested in the standby state. When the filter device 120 and the valve device 160 are controlled as in the following table, soft water generated by the first filter unit 121 in a removal mode may be supplied to the first consumption point C1 as illustrated in FIG. 5. Reclaimed water generated by the second filter unit 122 in a regeneration mode may be drained.

TABLE 2

| Main Valve 170 | First Valve 171 | Second Valve 172 | Third Valve 173 | Fourth Valve 174 | Fifth Valve 175 | Sixth Valve 176 | First Filter Unit 121 | Second Filter Unit 122 |
|---|---|---|---|---|---|---|---|---|
| Open | Closed | Open | Open | Closed | Closed | Open | Removal | Regeneration |

Hereinafter, control by the controller 150 will be described in more detail.

First, a standby state will be described.

In the standby state, the controller 150 may control the filter device 120 and the valve device 160 as in Table 1 below. The standby state of the filter units 121 and 122 may be a state in which the filter units 121 and 122 are stopped and power is not applied to the filter units 121 and 122. The standby state is a state in which supply of soft water to the When supply of soft water to the first consumption point C1 continues to be requested for a predetermined period of time (e.g., 90 seconds) after the control according to Table 2, the controller 150 may control the filter device 120 and the valve device 130 as in Table 3 below after the predetermined period of time elapses. When the filter device 120 and the valve device 160 are controlled as in the following table, soft water generated by the second filter unit 122 in a removal mode may be supplied to the first consumption point C1 as illustrated in FIG. 6. Reclaimed water generated by the first filter unit 121 in a regeneration mode may be drained.

TABLE 3

| Main Valve 170 | First Valve 171 | Second Valve 172 | Third Valve 173 | Fourth Valve 174 | Fifth Valve 175 | Sixth Valve 176 | First Filter Unit 121 | Second Filter Unit 122 |
|---|---|---|---|---|---|---|---|---|
| Open | Closed | Open | Closed | Open | Open | Closed | Regeneration | Removal |

When a request for supply of soft water to the first consumption point C1 is stopped within the predetermined period of time (e.g., 90 seconds) after the control according to Table 2, the controller 150 may control the filter device 120 and the valve device 160 as in Table 4 below. The following control is control for performing a regeneration mode on the first filter unit 121 used during the control according to Table 2.

TABLE 4

| Main Valve 170 | First Valve 171 | Second Valve 172 | Third Valve 173 | Fourth Valve 174 | Fifth Valve 175 | Sixth Valve 176 | First Filter Unit 121 | Second Filter Unit 122 |
|---|---|---|---|---|---|---|---|---|
| Open | Closed | Open | Closed | Open | Open | Closed | Regeneration | Standby |

When supply of soft water to the first consumption point C1 is requested again within a predetermined period of time (e.g., 90 seconds) after the control according to Table 4, the controller 150 may perform the control according to Table 3. When supply of soft water to the first consumption point C1 is not requested within the predetermined period of time (e.g., 90 seconds) after the control according to Table 4, the controller 150 may perform the control according to Table 1.

When supply of soft water to the first consumption point C1 continues to be requested for a predetermined period of time (e.g., 90 seconds) after the control according to Table 3, the controller 150 may control the filter device 120 and the valve device 160 as in Table 2 after the predetermined period of time elapses.

When a request for supply of soft water to the first consumption point C1 is stopped within the predetermined period of time (e.g., 90 seconds) after the control according to Table 3, the controller 150 may control the filter device 120 and the valve device 160 as in Table 5 below. The following control is control for performing a regeneration mode on the second filter unit 122 used during the control according to Table 3.

TABLE 5

| Main Valve 170 | First Valve 171 | Second Valve 172 | Third Valve 173 | Fourth Valve 174 | Fifth Valve 175 | Sixth Valve 176 | First Filter Unit 121 | Second Filter Unit 122 |
|---|---|---|---|---|---|---|---|---|
| Open | Closed | Open | Open | Closed | Closed | Open | Standby | Regeneration |

When supply of soft water to the first consumption point C1 is requested again within a predetermined period of time (e.g., 90 seconds) after the control according to Table 5, the controller 150 may perform the control according to Table 2. When supply of soft water to the first consumption point C1 is not requested within the predetermined period of time (e.g., 90 seconds) after the control according to Table 5, the controller 150 may perform the control according to Table 1.

Figure 7:
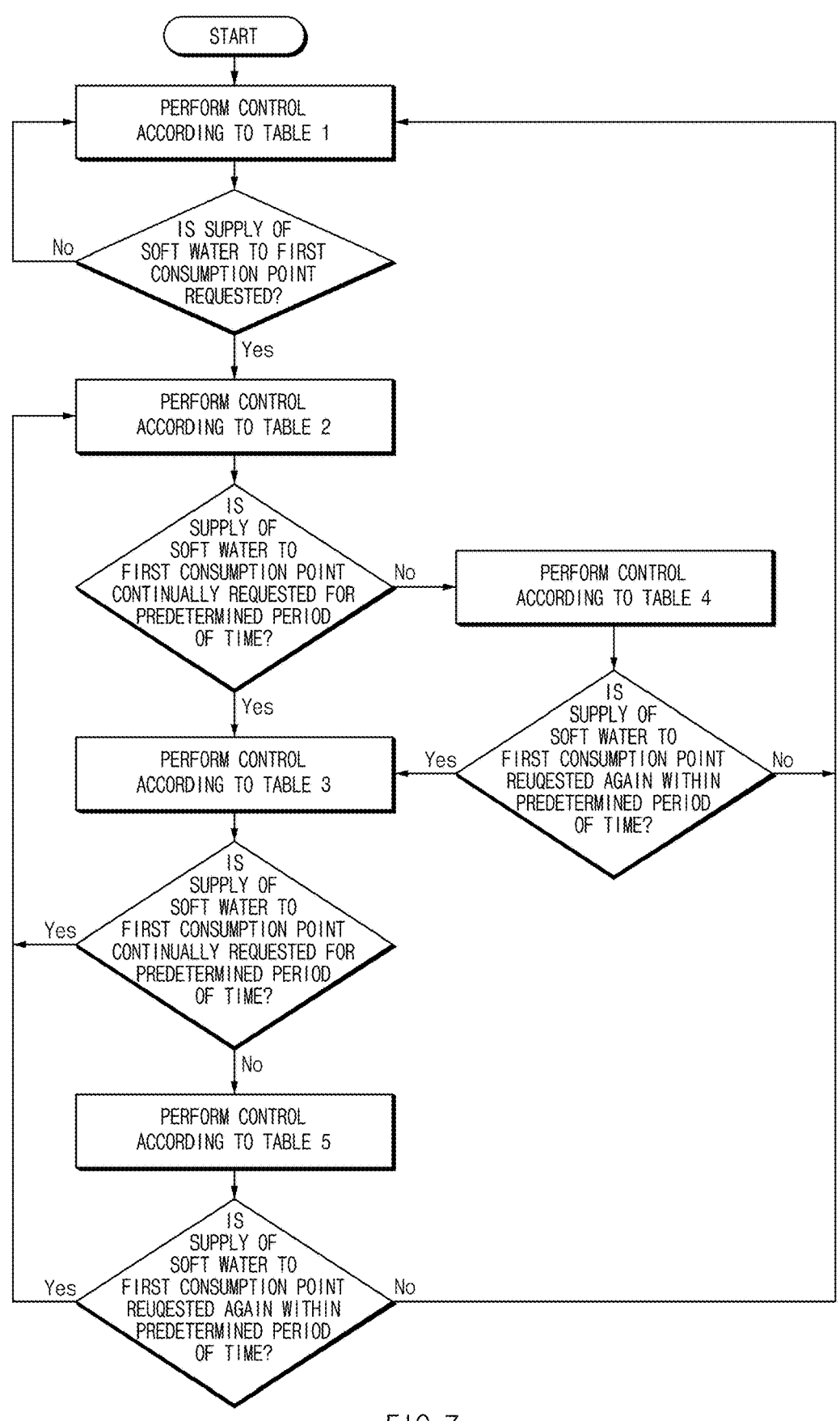
FIG. 7 is a flowchart illustrating a control flow when the water softening system of FIG. 2 supplies soft water to the first consumption point.

The above-described controls are illustrated in the flowchart of FIG. 7.

Figure 8:
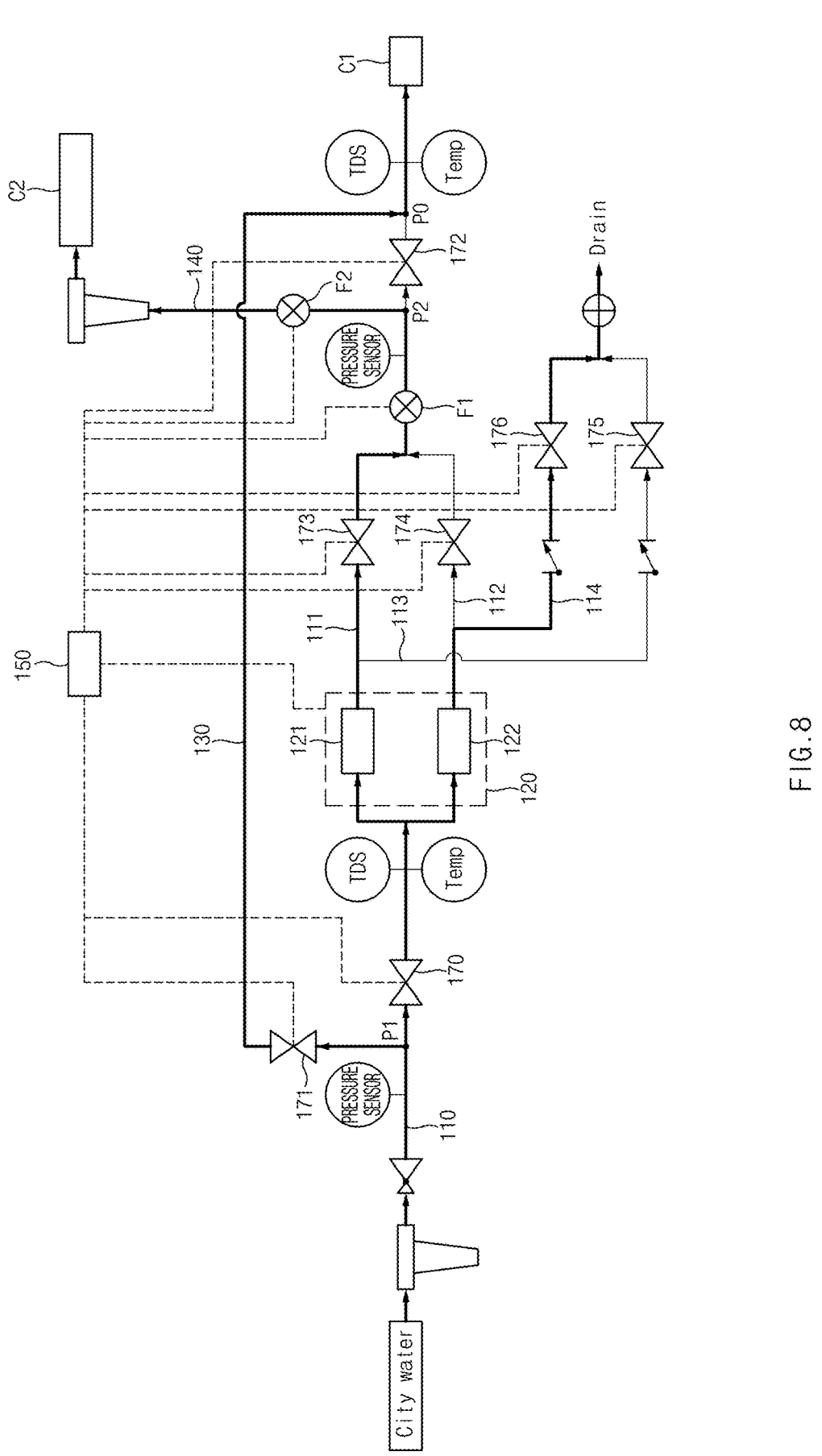
FIGS. 8 and 9 are views illustrating a case where the water softening system of FIG. 2 supplies drinking water to a second consumption point.
Figure 9:
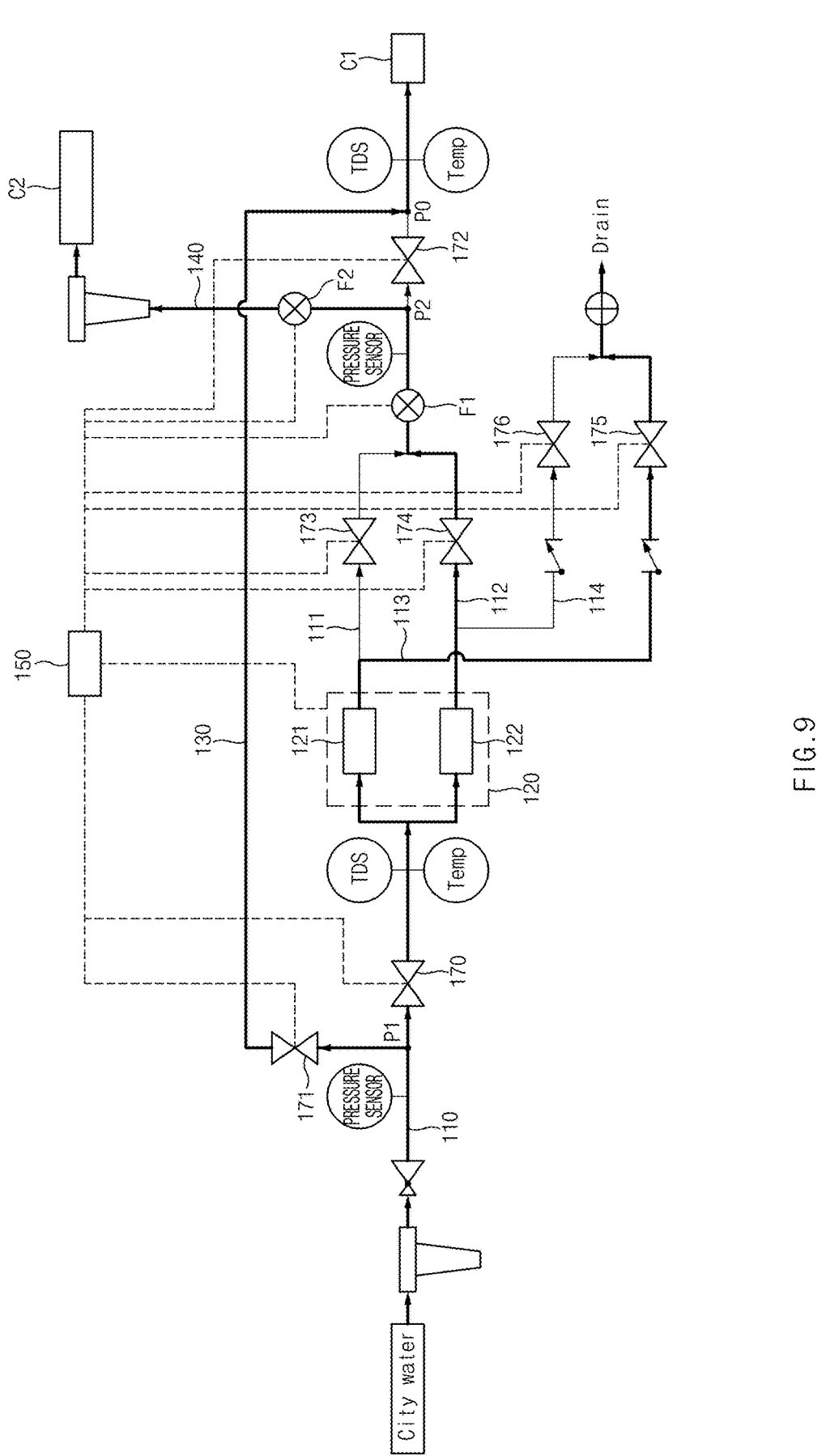

Third, a case where the water softening system of this embodiment supplies drinking water to the second consumption point C2 will be described below with reference to FIGS. 8 to 10. The following controls are illustrated in a flowchart of FIG. 10.

The controller 150 may control the filter device 120 and the valve device 160 as in Table 6 below when supply of drinking water to the second consumption point C2 is requested in the standby state. When the filter device 120 and the valve device 160 are controlled as in the following table, drinking water generated by the first filter unit 121 in a removal mode may be supplied to the second consumption point C2 as illustrated in FIG. 8. Reclaimed water generated by the second filter unit 122 in a regeneration mode may be drained.

TABLE 6

| Main Valve 170 | First Valve 171 | Second Valve 172 | Third Valve 173 | Fourth Valve 174 | Fifth Valve 175 | Sixth Valve 176 | First Filter Unit 121 | Second Filter Unit 122 |
|---|---|---|---|---|---|---|---|---|
| Open | Open | Closed | Open | Closed | Closed | Open | Removal | Regeneration |

The controller 150 may control the filter device 120 such that a higher voltage (e.g., 300 V) is applied to the first filter unit 121 than when soft water is supplied to the first consumption point C1. As the controller 150 controls the filter device 120 and the valve device 160 as described above, the water softening system of this embodiment may concentrate the performance of the filter device 120 on the supply of the drinking water to the second consumption point C2.

Meanwhile, as the first valve 171 is open in the above-described control, raw water may be supplied to the first consumption point C1 through the first bypass line 130 when supply of water to the first consumption point C1 is requested during the supply of the drinking water to the second consumption point C2.

When supply of drinking water to the second consumption point C2 continues to be requested for a predetermined period of time (e.g., 1,000 seconds) after the control according to Table 6, the controller 150 may control the filter device 120 and the valve device 130 as in Table 7 below after the predetermined period of time elapses. When the filter device 120 and the valve device 160 are controlled as in the following table, drinking water generated by the second filter unit 122 in a removal mode may be supplied to the second consumption point C2 as illustrated in FIG. 9. Reclaimed water generated by the first filter unit 121 in a regeneration mode may be drained.

TABLE 7

| Main Valve 170 | First Valve 171 | Second Valve 172 | Third Valve 173 | Fourth Valve 174 | Fifth Valve 175 | Sixth Valve 176 | First Filter Unit 121 | Second Filter Unit 122 |
|---|---|---|---|---|---|---|---|---|
| Open | Open | Closed | Closed | Open | Open | Closed | Regeneration | Removal |

When a request for supply of drinking water to the second consumption point C2 is stopped within the predetermined period of time (e.g., 1,000 seconds) after the control according to Table 6 and supply of soft water to the first consumption point C1 is not requested, the controller 150 may control the filter device 120 and the valve device 160 as in Table 8 below. The following control is control for performing a regeneration mode on the first filter unit 121 used during the control according to Table 6.

TABLE 8

| Main Valve 170 | First Valve 171 | Second Valve 172 | Third Valve 173 | Fourth Valve 174 | Fifth Valve 175 | Sixth Valve 176 | First Filter Unit 121 | Second Filter Unit 122 |
|---|---|---|---|---|---|---|---|---|
| Open | Closed | Open | Closed | Open | Open | Closed | Regeneration | Standby |

When supply of drinking water to the second consumption point C2 is requested again within a predetermined period of time (e.g., 90 seconds) after the control according to Table 8, the controller 150 may perform the control according to Table 7. When supply of drinking water to the second consumption point C2 is not requested within the predetermined period of time (e.g., 90 seconds) after the control according to Table 8, the controller 150 may perform the control according to Table 1.

When a request for supply of drinking water to the second consumption point C2 is stopped within the predetermined period of time (e.g., 1,000 seconds) after the control according to Table 6 and supply of soft water to the first consumption point C1 is requested, the controller 150 may perform the control according to Table 3.

When a request for supply of drinking water to the second consumption point C2 is stopped within a predetermined period of time (e.g., 1,000 seconds) after the control according to Table 7 and supply of soft water to the first consumption point C1 is not requested, the controller 150 may control the filter device 120 and the valve device 160 as in Table 9 below. The following control is control for performing a regeneration mode on the second filter unit 122 used during the control according to Table 7.

a state of supplying soft water to the first consumption point C1 to a state of supplying drinking water to the second consumption point C2. In this case, if the filter unit performing the removal mode at present has performed the removal mode for less than 45 seconds, the filter unit may be switched after performing the removal mode for the rest of 90 seconds.

A water softening system of the present disclosure may include a filter device provided in a main line, and a bypass line (refer to the above-described second bypass line) that is connected to a bypass point (refer to the above-described second bypass point) and that diverts soft water, which is released from the filter device to the main line, to a second consumption point in a consumption site, the bypass point being a point of the main line that is located downstream of the filter device. The water softening system of the present disclosure may further include the above-described controller.

According to the present disclosure, the water softening system may treat all of raw water supplied to the consumption site to supply soft water to the first consumption point in the consumption site.

Furthermore, according to the present disclosure, the water softening system may apply a higher voltage to the

TABLE 9

| Main Valve 170 | First Valve 171 | Second Valve 172 | Third Valve 173 | Fourth Valve 174 | Fifth Valve 175 | Sixth Valve 176 | First Filter Unit 121 | Second Filter Unit 122 |
|---|---|---|---|---|---|---|---|---|
| Open | Closed | Open | Open | Closed | Closed | Open | Standby | Regeneration |

When supply of drinking water to the second consumption point C2 is requested again within a predetermined period of time (e.g., 90 seconds) after the control according to Table 9, the controller 150 may perform the control according to Table 6. When supply of drinking water to the second consumption point C2 is not requested within the predetermined period of time (e.g., 90 seconds) after the control according to Table 9, the controller 150 may perform the control according to Table 1.

When a request for supply of drinking water to the second consumption point C2 is stopped within the predetermined period of time (e.g., 1,000 seconds) after the control according to Table 7 and supply of soft water to the first consumption point C1 is requested, the controller 150 may perform the control according to Table 2.

Figure 10:
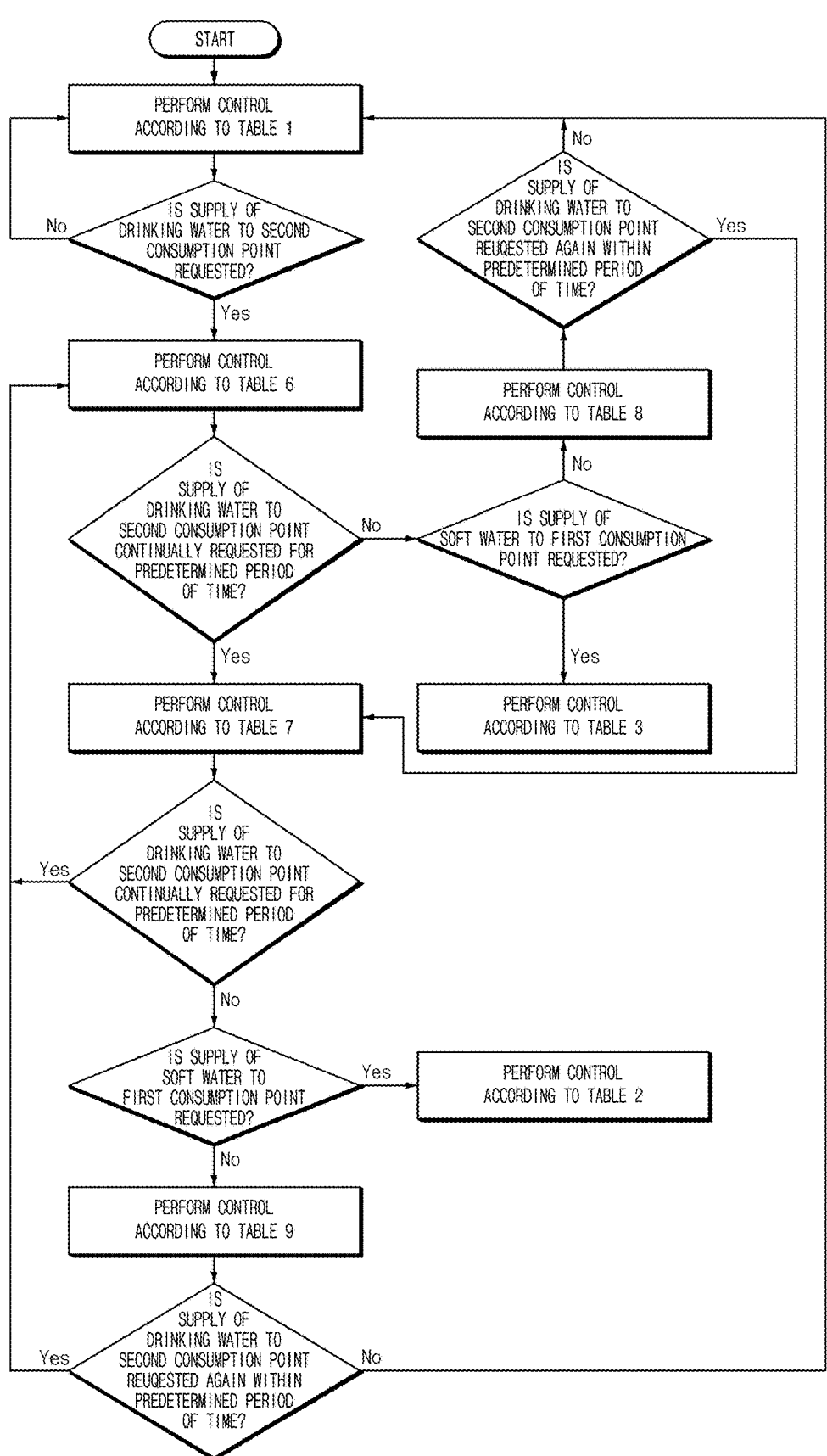
FIG. 10 is a flowchart illustrating a control flow when the water softening system of FIG. 2 supplies drinking water to the second consumption point.

The above-described controls are illustrated in the flowchart of FIG. 10.

For reference, when the water softening system transitions from a state of supplying soft water to the first consumption point C1 to a state of supplying drinking water to the second consumption point C2, or vice versa, a filter unit performing a removal mode at present may continue to perform the removal mode if the filter unit is able to continue to perform the removal mode.

For example, the filter units may be switched in 90-second periods, and the water softening system may transition from filter unit when soft water is supplied to the second consumption point through the second bypass line than when soft water is supplied to the first consumption point through the main line, thereby supplying soft water treated to be suitable for drinking water to the second consumption point.

In addition, according to the present disclosure, the water softening system may supply raw water to the first consumption point through the first bypass line while supplying drinking water to the second consumption point.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims. Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

15

What is claimed is:

1. A water softening system comprising:

a main line configured to supply raw water to a first consumption point in a consumption site;

a filter device provided in the main line and configured to remove at least a part of ionic substances contained in the raw water supplied through the main line and release soft water containing a smaller amount of ionic substances than the raw water to the main line;

a first bypass line configured to connect a first bypass point and a confluence point and divert the raw water in the main line from the first bypass point to the confluence point, wherein the first bypass point is one point of the main line that is located upstream of the filter device, and the confluence point is another point of the main line that is located downstream of the filter device;

a second bypass line connected to a second bypass point and configured to divert the soft water, which is released from the filter device to the main line, to a second consumption point in the consumption site, wherein the second bypass point is another point of the main line that is located between the filter device and the confluence point;

a valve device including a first valve provided in the first bypass line between the first bypass point and the confluence point and a second valve provided in the main line between the second bypass point and the confluence point;

a flow sensor disposed in the second bypass line and configured to sense a flow rate of the soft water flowing along the second bypass line; and a controller configured to control the valve device, wherein the controller is configured to:

determine that supply of the soft water to the second consumption point is requested when the flow sensor senses the flow rate of the soft water flowing along the second bypass line, and control the valve device such that the first valve is opened and the second valve is closed, upon determining that supply of the soft water to the second consumption point is requested, wherein the main line includes a first branch line and a second branch line configured to branch off from each other between the first and second bypass points and thereafter join together between the first and second bypass points, and wherein the filter device includes:

a first filter unit provided in the first branch line and configured to selectively perform one of a removal mode for removing the ionic substances by electro-deionization through electrodes and a regeneration mode for regenerating the electrodes; and a second filter unit provided in the second branch line and configured to selectively perform one of a removal mode for removing the ionic substances by electro-deionization through electrodes and a regeneration mode for regenerating the electrodes, wherein the valve device further includes a third valve provided downstream of the first filter unit in the first branch line, and a fourth valve provided downstream of the second filter unit in the second branch line, and wherein the controller is configured to further control the filter device,

wherein the main line further includes:

a first drain line connected to a point which is between the first filter and the third valve in the first branch line and configured to drain reclaimed water generated in the regeneration mode; and a second drain line connected to a point which is between the second filter and the fourth valve in the second branch line and configured to drain reclaimed water generated in the regeneration mode, wherein the valve device further includes a fifth valve provided in the first drain line, and a sixth valve provided in the second drain line.

2. The water softening system of claim 1, wherein the filter device includes a filter unit configured to remove at least a part of the ionic substances contained in the raw water, based on an electric force, wherein the controller is configured to further control the filter device, and wherein the controller controls the filter device such that a higher voltage is applied to the filter unit when the soft water is supplied to the second consumption point through the second bypass line than when the soft water is supplied to the first consumption point through the main line, in order to increase a removal amount of the ionic substances.

3. The water softening system of claim 1, wherein the controller performs control such that the first valve is closed and the second valve is opened, when supply of the soft water to the first consumption point is requested and supply of the soft water to the second consumption point is not requested.

4. The water softening system of claim 1, wherein when supply of the soft water to the second consumption point is requested, the controller performs control such that:

the first valve is opened;

the second valve is closed;

the third valve is opened;

the fourth valve is closed;

the first filter unit performs the removal mode; and the second filter unit performs the regeneration mode.

5. The water softening system of claim 4, wherein when supply of the soft water to the second consumption point continues to be requested until predetermined first reference time elapses from the time the soft water starts to be supplied to the second consumption point, the controller performs control after the first reference time such that:

the first valve maintains an open state;

the second valve maintains a closed state;

the third valve is closed;

the fourth valve is opened;

the first filter unit performs the regeneration mode; and the second filter unit performs the removal mode.

6. The water softening system of claim 1, wherein when supply of the soft water to the second consumption point is requested and thereafter supply of the soft water to the first and second consumption points is not requested, the controller performs control such that:

the first valve is closed or maintains a closed state;

the second valve is opened or maintains an open state;

one of the third and fourth valves that remains open is closed;

the other valve that remains closed is opened;

one of the first and second filter units that performs the regeneration mode stops operation; and the other filter unit that performs the removal mode performs the regeneration mode.

7. The water softening system of claim 1, wherein when supply of the soft water to the second consumption point is requested and thereafter supply of the soft water to the second consumption point is not requested in a state in which supply of the soft water to the first consumption point is requested, the controller performs control such that:

the first valve is closed or maintains a closed state;

the second valve is opened or maintains an open state;

one of the third and fourth valves that remains open is closed;

the other valve that remains closed is opened;

one of the first and second filter units that performs the regeneration mode performs the removal mode; and the other filter unit that performs the removal mode performs the regeneration mode.

8. The water softening system of claim 1, wherein in a predetermined standby state, the controller performs control such that:

the first valve is closed or maintains a closed state;

the second valve is opened or maintains an open state;

the third valve is opened or maintains an open state;

the fourth valve is closed or maintains a closed state; and the first and second filter units stop operation or maintain a stop state.

9. The water softening system of claim 8, wherein when supply of the soft water to the first or second consumption point is requested and thereafter supply of the soft water to the first and second consumption points is not requested, the controller performs control such that the first to fourth valves and the first and second filter units are in the standby state.

* * * * *